United States Patent
Koh et al.

(10) Patent No.: US 7,490,032 B1
(45) Date of Patent: Feb. 10, 2009

(54) FRAMEWORK FOR HARDWARE CO-SIMULATION BY ON-DEMAND INVOCATIONS FROM A BLOCK MODEL DIAGRAM DESIGN ENVIRONMENT

(75) Inventors: David Koh, Boston, MA (US); Mary Ann Nazario, Waltham, MA (US); Donald Paul Orofino, II, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 682 days.

(21) Appl. No.: 11/028,172

(22) Filed: Dec. 30, 2004

Related U.S. Application Data (60) Provisional application No. 60/611,617, filed on Sep. 20, 2004.

(51) Int. Cl.
*G06F 9/45* (2006.01)
(52) U.S. Cl. .................................. 703/22; 707/203
(58) Field of Classification Search .............. 703/22; 707/2, 200, 201, 203; 714/28
See application file for complete search history.

(56) References Cited

U.S. PATENT DOCUMENTS

| | | | | |
|---|---|---|---|---|
| 5,680,542 A | * | 10/1997 | Mulchandani et al. | ........ 714/28 |
| 6,587,995 B1 | * | 7/2003 | Duboc et al. | .................. 716/4 |
| 6,983,234 B1 | * | 1/2006 | Hangal et al. | ................. 703/14 |

OTHER PUBLICATIONS

Ries et al., B. The Paragon Performance Monitoring Environment, Supercomputiing, IEEE, Nov. 1993, pp. 850-859.*

* cited by examiner

*Primary Examiner*—Russell Frejd
(74) *Attorney, Agent, or Firm*—Lahive & Cockfield, LLP; Kevin J. Canning

(57) ABSTRACT

The present invention relates to integration of an external processor capable of execution of one or more functions into a block diagram model environment such that the block diagram model environment can make function calls directly into the external processor without the need for traditional wait loops or handshaking means. Furthermore the results of the function that was called in the external processor can be passed to the block diagram model environment from the external processor.

16 Claims, 7 Drawing Sheets

FRAMEWORK FOR HARDWARE CO-SIMULATION BY ON-DEMAND INVOCATIONS FROM A BLOCK MODEL DIAGRAM DESIGN ENVIRONMENT

RELATED APPLICATIONS

The present application claims priority to U.S. Provisional Application Ser. No. 60/611,617 filed Sep. 20, 2004 for all subject matter common to both applications. The disclosure of the above-mentioned application is hereby incorporated by reference herein in their entirety.

FIELD OF THE INVENTION

The present invention relates to integration of target platform code into the context of a simulation, in particular to methods and systems for providing a scalable code implementation solution wherein the target is unaware of the simulation and a function performed by the target is invoked by the host from the simulation.

BACKGROUND OF THE INVENTION

Block diagrams are used to model real-world systems. Historically, engineers and scientists have utilized time-based block diagram models in numerous scientific areas such as Feedback Control Theory and Signal Processing to study, design, debug, and refine dynamic systems. Dynamic systems, which are characterized by the fact that their behaviors change over time, are representative of many real-world systems. A dynamic system (either natural or man-made) is a system whose response at any given time is a function of its input stimuli, its current state, and the current time. Such systems range from simple to highly complex systems. Physical dynamic systems include a falling body, the rotation of the earth, bio-mechanical systems (muscles, joints, etc.), bio-chemical systems (gene expression, protein pathways), and weather and climate pattern systems. Examples of man-made or engineered dynamic systems include: a bouncing ball, a spring with a mass tied on an end, automobiles, airplanes, control systems in major appliances, communication networks, audio signal processing, nuclear reactors, and a stock market.

A block diagram model of a dynamic system is represented schematically as a collection of blocks interconnected by lines that represent signals. A signal represents the input and output of a dynamic system. Each block represents an elemental dynamic system. A line emanating at one block and terminating at another signifies that the output of the first block is an input to the second block. Each distinct input or output on a block is referred to as a port. Signals correspond to the time-varying quantities represented by each line connection and are assumed to have values at each time instant at which the connecting blocks are enabled. The source block of a signal writes to the signal at a given time instant when its system equations are solved. The destination blocks of this signal read from the signal when their system equations are being solved.

Time-based block diagram models may be thought of as relationships between signals and state variables representative of a dynamic system. The solution (computation of system response) of the model is obtained by evaluating these relationships over time. The time-based relationship may start at a user-specified "start time" and end at a user-specified "stop time", or the evaluations may continue indefinitely. Each evaluation of these relationships is part of a time step. Signals represent quantities that change over time. The relationships between signals and state variables are defined by sets of equations represented by blocks. These equations define a relationship between the input signals, output signals, state, and time.

It should be noted that the term "block diagram" as used herein is also used to refer to other graphical modeling formalisms. For instance, flow-charts are block diagrams of entities that are connected by relations. Flow-charts are used to capture process flow and are not generally suitable for describing dynamic system behavior. Data flow block diagrams are diagrams of entities with relations between them that describe a graphical programming paradigm where the availability of data is used to initiate the execution of blocks, where a block represents an operation and a line represents execution dependency describing the direction of data flowing between blocks. It will be appreciated that a block diagram model may include entities that are based on other modeling domains within the block diagram. A common characteristic among these various forms of block diagrams is that they define semantics on how to execute them.

As noted above, professionals from diverse areas such as engineering, science, education, and economics build computational models of dynamic systems in order to better understand system behavior as it changes with the progression of time. The computational models aid in building "better" systems, where "better" may be defined in terms of a variety of performance measures such as quality, time-to-market, cost, speed, size, power consumption, robustness, etc. The computational models also aid in analyzing, debugging and repairing existing systems (be it the human body or the anti-lock braking system in a car). As systems become more complex, an increasingly large amount of time and effort is involved in creating accurate, detailed models. These models are typically hybrid dynamic systems that span a variety of domains, including continuous dynamics and discrete behavior, physical connections, and event-driven states. To add to the complexity, these systems may be depicted in a number of ways, including dynamic or physics block diagrams, finite state machines, and hand-written or automatically generated computer code.

Historically, software developers have utilized co-simulation technology in the design and testing of software. A proposed algorithm to be implemented on hardware is first simulated in a model environment on a host simulation environment, such as personal computer, workstation or the like. Then, incrementally, portions of the algorithm are translated to software for execution on an external processor platform. An external processor can include devices such as a general purpose processor (GPP), microcontroller, an application-specific integrated circuit (ASIC), a field programmable gate array (FPGA), a digital signal processor (DSP) or some combination thereof. By invoking co-simulation technology the software may be tested and verified in the context of the entire application design. Furthermore, the use of co-simulation technology allows multiple developers to simultaneously work on individual components of the block diagram simulation model. The work of each of these developers on either a single portion of the block diagram model, or distinct portions of the block diagram model can then be incorporated into the block diagram simulation model for further testing and evaluation. Following the incorporation of each of these individual components into the host simulation model, the system performance and characteristics can be further evaluated prior to the construction of the entire application.

Existing co-simulation technology provides for the integration of an external processor into the host side simulation environment in a synchronized way. This synchronization currently requires a peer to peer handshaking arrangement between the host simulation environment and the external processor. From the host side simulation, input parameters are assigned and sent to the external processor and the output of the external processor is retrieved for continued simulation in the host simulation environment.

From the processor side of existing co-simulation technology, the code running on the external processor must be modified to include one or more forced time delays, for example one or more wait loops. For example, code running on the external processor will contain a wait loop or a handshaking means in addition to traditional function calls. The wait loop will run continuously on the external processor waiting for a trigger signal from the host simulation environment. This trigger can take the form of a Boolean flag, for example, and upon receipt of a trigger signal from the host simulation environment, an appropriate driver is called such that the driver can get the required function input from the simulation model. Having received the function input parameters, the execution of a desired function on the external processor can begin. Following the execution of the function on the external processor, the output of the executed function can then be returned to the model environment using a handshaking mechanism between host simulation environment and external processor such that the handshaking mechanism provides a mechanism for communication and data transfer between the simulation environment and the external processor. Handshaking such as this typically occurs following the invoking of processor to host device drivers that allows for communication between the two environments. One such example of conventional co-simulation code is:

```
Loop_forever
    If trigger
        Call device driver to get function input from host
        Call embedded function
        Call device driver to send function output to host
    End if
End loop
``` wherein co-simulation specific code is identified by the use of italics.

As evidenced in the above referenced code, the external processor continually runs the wait loop, forcing a time delay in a portion of the code, in anticipation of a trigger signal from the host simulation environment. Upon receipt of the trigger signal, a device driver is called that retrieves the intended function inputs from the host simulation environment. These intended function inputs are then passed to the called embedded function of the prior example, and in turn, the function executes. Following the execution of the function in the external processor, a device driver is called wherein the device driver is utilized for sending the output of the function to the host simulation environment in support of the co-simulation.

In view of this, existing co-simulation technology results in the creation of two sets of code for running on the external processor. The first set of code, namely a test version, contains a handshaking instruction including device drivers and calls to these device drivers to obtain the function inputs, as well as passing the function outputs back to the host simulation environment. These handshaking instructions run in a perpetual wait loop on the external processor, awaiting an initial trigger from the host simulation environment signaling the need for execution of a function outside the host simulation environment.

A second deployed version of code for use on the external processor is subsequently generated wherein the handshaking instructions and wait loop is no longer necessary for performing co-simulation between the host simulation environment and the external processor. However, testing of this deployed version of code in a co-simulation environment is difficult or impossible, therefore there exists a great potential for code conflicts and unanticipated negative results in the deployed version of the code.

SUMMARY OF INVENTION

The present invention relates to integration of a target processor into a simulation environment, such that the target processor operates in a processor in the loop (PIL) environment without the target platform being aware of the simulation environment. Unlike traditional static testing, wherein functionality of a particular component is tested by providing known inputs and measuring the outputs, dynamic testing such as PIL, using numerous input parameters, provides for testing of a design under real world conditions without the associated risks of actual real world testing. Furthermore, while using PIL, the performance of a simulated design can be evaluated using conditions that may seldom be encountered in the real world. For example, when using PIL of an automotive engine management controller, temperature extremes unlikely to be encountered in the real world may be evaluated, such that highly unlikely, yet possible, deficiencies in the controller can be determined. Furthermore, using PIL allows for rapid testing as the model may be run and tested at a speed faster than real time.

When employing PIL techniques within graphical modeling environments, such as a block diagram model environment, the hardware or processor used in the PIL simulation is traditionally made "aware" of its integration into the graphical model environment. For example, the hardware or processor may run modified code, as compared to code which will be deployed following construction of the simulated system, such that the HIL or PIL simulation can occur. This code may include wait loops, or specific device driver calls for use in the simulation to make the target platform aware of the simulation environment.

The present invention allows a target platform in a PIL environment to be "unaware" of its integration into the simulation environment. In light of this, co-simulation specific device driver calls or wait loops to be executed by the external processor are no longer necessary. Integration of hardware or processors into a simulation environment, therefore, occurs in a seamless manner such that control of the target platform can be maintained from within the graphical model exclusively. In accordance with one embodiment of the present invention, in a block diagram modeling environment, a method is performed that comprises the steps of providing a block diagram model of a system simulating at least a portion of the block diagram simulation model. A communication channel between the block diagram model environment and an external processor is further provided, wherein a function can be called in the external processor from the block diagram model environment. In the block diagram model environment, the various blocks of the model can correspond to specific functions for execution in the external processor. Additionally, a single block within the block diagram model environment can represent several functions to be called in the external environment. Using traditional co-simulation techniques, a wait loop and associated program would thereby call the function in an external processor. In contrast, the present invention allows a block in the block diagram model to directly call the function in the external processor. In light of this, the need for a specific program that is used to call a function is no longer necessary.

In accordance with another aspect, the present invention provides a system for simulating an electronic circuit, model or apparatus, wherein the system includes a simulation environment and a processor external thereto. The processor is located external to the simulation environment, such that the application executed by the external processor and the simulation environment run in different processes or threads, and potentially on different processors altogether, yet remain in communication with each other. Furthermore, the simulation environment can call a function for execution on the processor via the communication channel, from within the simulation model. The call of a function for execution on the external processor is such that the output of the called function in the external processor can be retrieved by the simulation environment and further used within the simulation environment without the use of specific drivers for passing data.

In accordance with another aspect of the present invention, a method is provided for use within a network wherein a server and client are provided. The server executes a graphical modeling environment wherein the graphical modeling environment provides a block diagram model of a dynamic system. Additionally the client is in communication with the server via a network. A block from within the block diagram model is selected, wherein the block is a gateway block that provides for communication between the simulation environment and the external processor using a communication channel. Following the establishment of the communication channel, the block diagram model can call a function residing on the external processor. The external processor can then execute the function residing on the processor and subsequently the results of the executed function can be retrieved by the graphical modeling environment using a communication channel.

In accordance with another embodiment of the present invention, a system for generating and displaying a graphical model application is taught. The system can comprise a computing device including memory for storing computer programs and data, and a processor for executing said programs and data. Additionally a gateway block is provided wherein the gateway block is capable of communicating with an external processor via a communication channel established between the model environment and the external environment. Using the communication channel, the gateway block allows for the calling of functions in the external processor from within the model environment. One skilled in the art will readily recognize that the gateway block may take numerous forms, and the herein referenced gateway block is solely used for illustrative purposes. Function calls from the model environment are delivered to the external processor via the communication channel, and if necessary, the results of the call function in the external processor can be delivered back to the model environment via the communication channel.

BRIEF DESCRIPTION OF FIGURES

An illustrative embodiment of the present invention will be described below relative to the following drawings.

DETAILED DESCRIPTION

The present invention relates to integration of a target processor into a simulation environment, such that the target processor operates in a processor in the loop (PIL) environment without the target platform being aware of the simulation environment. Unlike traditional static testing, wherein functionality of a particular component is tested by providing known inputs and measuring the outputs, dynamic testing such as PIL, using numerous input parameters, provides for testing of a design under real world conditions without the associated risks of actual real world testing. Furthermore, while using PIL, the performance of a simulated design can be evaluated using conditions that may seldom be encountered in the real world. For example, when using PIL of an automotive engine management controller, temperature extremes unlikely to be encountered in the real world may be evaluated, such that highly unlikely, yet possible, deficiencies in the controller can be determined. Furthermore, using PIL allows for rapid testing as the model may be run and tested at a speed faster than real time.

When employing PIL techniques within graphical modeling environments, such as a block diagram model environment, the hardware or processor used in the PIL simulation is traditionally made "aware" of its integration into the graphical model environment. For example, the hardware or processor may run modified code, as compared to code which will be deployed following construction of the simulated system, such that the HIL or PIL simulation can occur. This code may include wait loops, or specific device driver calls for use in the simulation to make the target platform aware of the simulation environment.

The present invention allows a target platform in a PIL environment to be "unaware" of its integration into the simulation environment. In light of this, co-simulation specific device driver calls or wait loops to be executed by the external processor are no longer necessary. Integration of hardware or processors into a simulation environment, therefore, occurs in a seamless manner such that control of the target platform can be maintained from within the graphical model exclusively.

For the purpose of clarity, the term "external processor" is herein defined to include devices such as general purpose processors (GPP), microcontrollers, digital signal processors (DSP), processor simulation environments, software components, processor emulators, or some combination thereof.

The external processor and the code running on the external processor, therefore, operate in a manner similar to the manner in which it would operate in a final completed deployment of the model-designed application or the like. Software code run by the external processor, therefore, is indicative or identical to code that will be deployed upon actual physical construction of the simulation model. In light of this, rigorous testing and evaluation of the external processors, and code executed by the external processors, can occur wherein the performance of the external processors are evaluated in a form similar to that which will be deployed when the model from the simulation environment is reduced to practice in a non-simulation environment.

Furthermore, the model representing the simulation can make calls to the external processors to execute functions on the hardware components associated with the external processors. The invoking of function calls on the hardware associated with the external processors, from the model environment, is executed in a manner that is representative of the calling of function calls in the constructed version of the simulation model that is intended for execution on the external processor.

Figure 1:
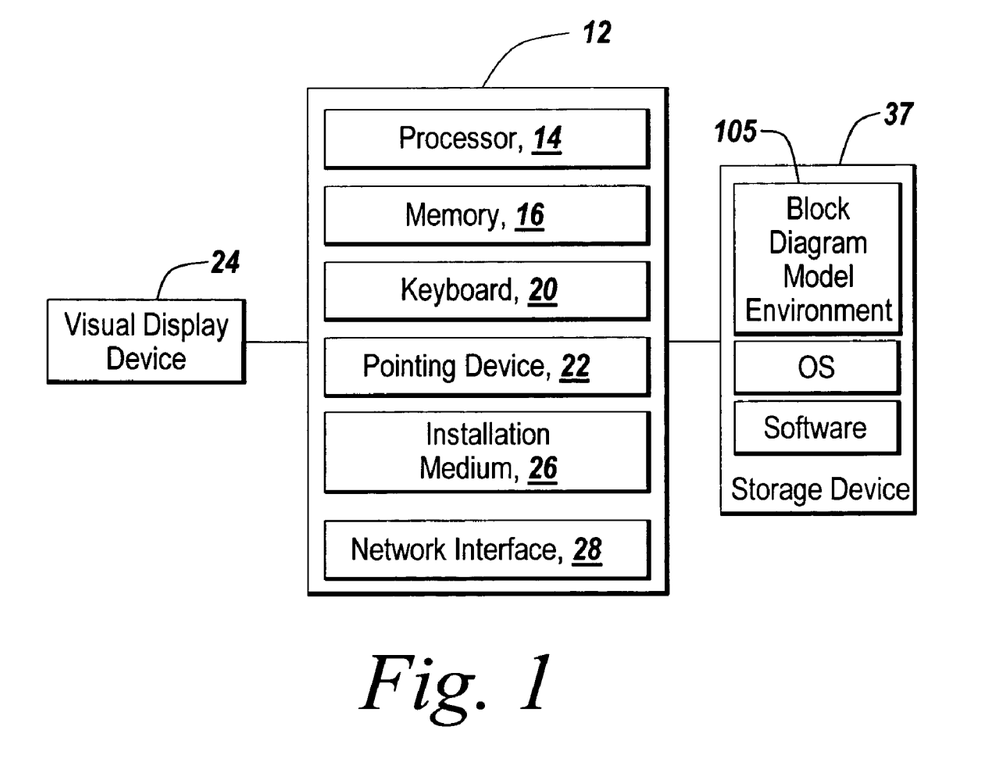
FIG. 1 is an exemplary model illustrating an environment suitable for practicing the illustrative embodiment of the present invention.

FIG. 1 depicts an environment suitable for practicing an illustrative embodiment of the present invention. The environment includes a computing device 12 having memory 16, on which software according to one embodiment of the present invention may be stored, a processor (CPU) 14 for executing software stored in the memory 16, and other programs for controlling system hardware. The memory 16 may comprise a computer system memory or random access memory such as DRAM, SRAM, EDO RAM, etc. The memory 16 may comprise other types of memory as well, or combinations thereof. A human user may interact with the computing device 12 through a visual display device 24 such as a computer monitor, which may include a graphical user interface (GUI). The computing device 12 may include other I/O devices such a keyboard 20 and a pointing device 22, for example a mouse, for receiving input from a user. Optionally, the keyboard 20 and the pointing device 22 may be connected to the visual display device 24. The computing device 12 may include other suitable conventional I/O peripherals. The computing device 12 may support any suitable installation medium 26, a CD-ROM, floppy disks, tape device, USB device, hard-drive or any other device suitable for installing software programs such as the software of the block diagram model environment 105 of the present invention. The computing device 12 may further comprise a storage device 37, such as a hard-drive or CD-ROM, for storing an operating system and other related software, and for storing application software programs such as the block diagram model environment 105 of the present invention. Additionally, the operating system and the block diagram simulation environment 105 can be run from a bootable CD, such as, for example, KNOPPIX®, a bootable CD for GNU/Linux.

Additionally, the computing device 12 may include a network interface 28 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), cluster interconnection (Myrinet), peripheral component interconnections (PCI, PCI-X), wireless connections, or some combination of any or all of the above. The network interface 28 may comprise a built-in network adapter, network interface card, PCMCIA network card, card bus network adapter, wireless network adapter, USB network adapter, modem or any other device suitable for interfacing the computing device 28 to any type of network capable of communication and performing the operations described herein. Moreover, the computing device 12 may be any computer system such as a workstation, desktop computer, server, laptop, handheld computer or other form of computing or telecommunications device that is capable of communication and that has sufficient processor power and memory capacity to perform the operations described herein.

The present invention provides a technical computing environment comprising a block diagram simulation environment 105. In brief overview, the block diagram simulation environment 105 allows for the construction and evaluation of an electronic circuit, a system and the like. For the purpose of clarity, the term "electronic circuit" is herein defined as an application description intended for use on an external processor, a design or model of an electronic circuit, an apparatus representative of an electronic circuit, some combination thereof. In the block diagram simulation environment 105, customizable functional blocks are used to create a model that is representative of a desired application to be implemented on processors, system or the like. The block diagram simulation environment 105 provides an environment for creating, designing, simulating, testing and verifying the application design, system or the like under a variety of conditions.

In an exemplary embodiment, the block diagram simulation environment 105, such as the Simulink® simulation environment or the MATLAB® program environment, both of which are offered by The MathWorks, Inc. of Natick, Mass., provides a graphical and interactive environment by which system designers can use a model-based design approach to model an electronic circuit or an application design. With a model-based design approach, the block diagram simulation environment 105 allows a system design to be an executable specification. An executable specification is a specification that provides a visual design description of a system from which code can be automatically generated for testing and prototyping in a working implementation. A working implementation of the simulation environment is defined as a region, a portion, or the entire model of the block diagram simulation environment when implemented in hardware and software located on one or more external processors. A model-based design approach such as this allows for changes or corrections to the system model to be quickly implemented, evaluated within the simulation environment, and then automatically reflected in code generated from the model for use by a processor or hardware component external to the simulation environment.

Figure 2:
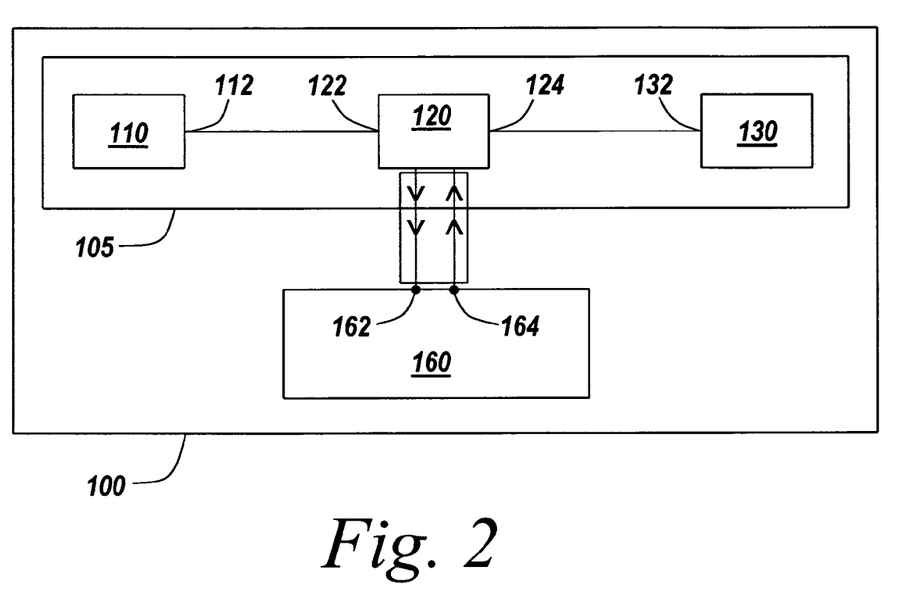
FIG. 2 is an exemplary graphical model illustrating an environment suitable for practicing the illustrative embodiment of the present invention.

FIG. 2 illustrates a system 100 suitable for practicing an illustrative embodiment of the present invention. The system for designing an application and co-simulating with an external processor 100 can take numerous forms. In one embodiment, the system for designing an application and co-simulating with an external processor 100 can include a fully integrated development environment (IDE), which serves as a development environment for the external processor with control and communications capabilities with the external processor. IDE is hereinafter defined as a programming component integrated into a software component that provides a Graphical User Interface (GUI) builder, a text editor, a code editor, a compiler, an interpreter, a debugger or any combination thereof.

The illustrative embodiment of the present invention is further described using a host environment represented by a block diagram model environment 105. An exemplary block diagram model environment 105 for simulating an application design, for example, may be created in Simulink®. Simulink® is offered by The MathWorks, Inc. of Natick, Mass., which provides tools for modeling and simulating a variety of dynamic systems in one integrated, graphical environment. Nevertheless, those skilled in the art will appreciate that the principles and concepts described herein are equally applicable to other graphical modeling environments.

The system for simulating an application design 100 includes a host block diagram model environment 105 and an external processor 160. The illustrated block diagram model environment 105 of the present invention includes a number of blocks. For illustrative purposes, the host block diagram model environment of the present invention 105 includes a source block 110, a gateway block 120 and a sink block 130. Those skilled in the art will appreciate that the host block diagram model environment 105 can be as complex as needed to represent the simulated application design and may include additional blocks beyond those depicted in the illustrated embodiment.

Figure 2A:
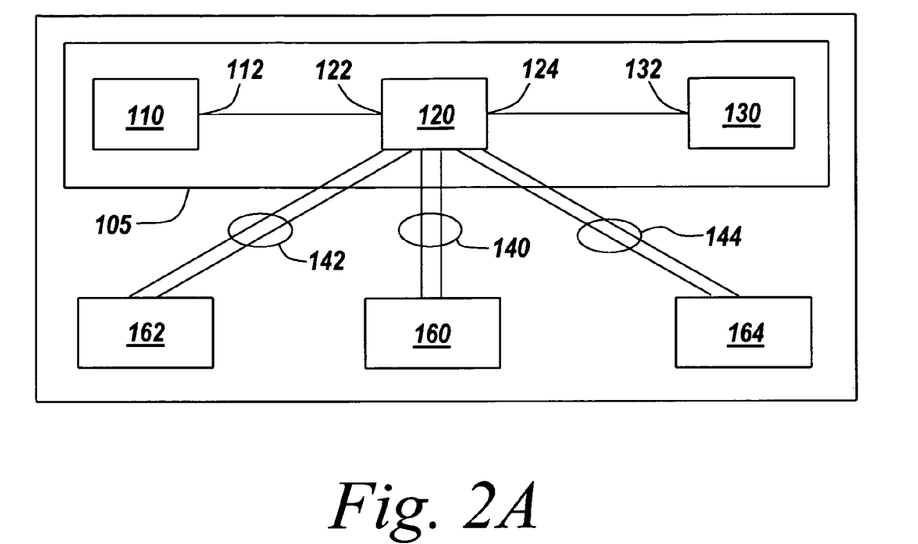
FIG. 2A is an exemplary graphical model illustrating an environment suitable for practicing the illustrative embodiment of the present invention.

The external processor 160 of the present invention may additionally take numerous forms. For example, in one embodiment the external processor 160 can be a digital signal processor (DSP). Furthermore, those skilled in the art will appreciate that more than one external processor 160 can be associated with the host block diagram model environment 105, and more than one block diagram model environment 105 can be associated with the external processor 160, or any combination thereof. For example, as illustrated in FIG. 2A, three external processors 160,162,164, are associated with the gateway block 120 using three communication channels 140,142,144.

The present invention provides for the calling of a function on the external processor 160 directly from the block diagram model environment 105 via a communication channel 140. Furthermore, a gateway block 120 is associated with the block diagram model environment 105. The gateway block 120 may transmit and receive data for exchange between the block diagram model environment 105 and the external processor 160 using the communication channel 140. For illustrative purposes, the gateway block 120 is shown as a single entity. One skilled in the art will readily recognize, however, that the gateway block can contain discrete components capable of accomplishing a variety of tasks. For example, the gateway block can include a component for use in passing the input parameters of a function to be executed to the external processor, a component for use in executing the function, and a component which retrieves the output parameters from the external processor. Using a plurality of discrete components designed for accomplishing individual tasks, the interaction between the block diagram model environment and the external processor can be separated.

The division of the gateway block into the aforementioned three components, however, is merely illustrative and in practice the gateway block can be divided into a plurality of components for accomplishing the intended task, or in the alternative can be represented by a single component capable of accomplishing all necessary tasks. When used in conjunction with a block diagram model environment, for example, the individual components of the communication represented by the gateway block 120 can take the form of icons or plain text, such that the incorporation of these components into the block diagram model is readily accomplished. In light of this, the input variables required for a function to be executed on the external processor, contained within the host block diagram model environment 105, can be passed to the external processor 160 via the gateway block 120 and communication channel 140. For example, the input parameters of a function can be set and the return output parameters of the executed function can be retrieved. In addition, variables global to the function and used by the function but not explicitly marked as input can be set.

Furthermore, following execution of the function in the external processor 160 the results are retrieved by the block diagram model environment 105 using the communication channel 140 and gateway block 120, wherein the function output parameters can further be incorporated into the block diagram model environment 105. The results retrieved by the block diagram model environment 105 can be the results of the executed function or may be modified input values which were initially provided to the external processor 160. In light of this, code running on the external processor 160 does not require a continually running wait loop, wherein the wait loop awaits a trigger signal from the block diagram model environment 105 to begin execution of functions within the external processor 160. Additionally, the need for device driver calls from within the external processor 160 to the block diagram model environment 105, wherein these device driver calls request function input arguments from the block diagram model environment 105 are eliminated.

Additionally, the need for additional device driver calls between the external processor and the block diagram model environment for use in delivering the results of the function to the block diagram model environment are further eliminated. In light of such an arrangement, the code running on the external processor 160 is such that co-simulation specific wait loops and handshaking means using device driver calls are no longer necessary while operating within the co-simulation environment. Therefore, code running on the external processor closely resembles, or is identical to, code that will be implemented upon deployment of the model under simulation.

In one embodiment, the establishment of the communication channel 160, between the gateway block 120 in the block diagram model environment 105 and the external processor 160 is generated by invoking an application program interface (API) containing a set of routines and protocols necessary for initiating control and data transfer communications to the external processor from within the block diagram model environment 105. By invoking the API individual functions of the processor in the external environment can be called with input parameters provided from the model environment for use in the processor environment. Additionally, with the API several functions residing on the external processor can be called 160. Furthermore, for each processor, using the API the model environment can manage all context switching associated with calling the function, such as saving and restoring context, setting the program counter, setting a breakpoint at the end of the called function, and executing the external processor. After the function has executed, the API can be used in retrieving the output data via the communication channel for use in the block diagram model environment 105.

The present invention replaces the need for traditional programs which call a function. For example, using traditional means, a C program language would be responsible for calling a function to be executed by the external processor. In the present invention, in contrast, the block diagram model replaces the C program, and in turn is used for calling the function to be executed in the external processor. The block diagram model is therefore responsible for context switching through an application program interface (API), accessing the stack, registers, global memory locations and further has access to the symbol table. Actions such as this would typically be controlled by the calling program utilized by existing prior art, and are now controlled by the block diagram model.

In another embodiment, the communication channel 140 can further be established through use of the integrated development environment (IDE) associated with the external processor 160. Many IDEs of external processors expose a communication channel interface for use with host-side applications to communicate with the host side application such that external processor data can be accessed by the host side application. In one embodiment the IDE may be accessible through C/C++, Basic, or another programming or scripting languages. For example Texas Instruments Code Composer Studio™ allows C++ and Perl programs to communicate with the IDE, and exposes various attributes of the external processor and allows the external processor to be controlled in a number of respects. Those skilled in the art will appreciate that Code Composer Studio™ is representative of numerous other software tools suitable for use with the present invention. In the present invention, control over running the external processor, reading and writing to memory locations, reading and writing to registers, setting and removing of breakpoints within code, and reading of the symbol table can be controlled in the external processor 160 via the communication channel 140 by the block diagram model environment 105.

The communication channel 140 further allows bidirectional communication between the block diagram model environment 105 and the external processor 160. In the illustrative example, the source block 110 can produce an initial signal that can be passed from the output port 112 of the source block 110 to the input port 122 of the gateway block 120. The gateway block 120 provides a mechanism for determining if a communication to the external processor 160 is necessary. If there is a need to communicate with the external processor 160, the gateway block 120 provides a mechanism for delivering of the necessary instructions to the communication channel 140 and subsequently to the external processor 160. For example, the gateway block 120 can allow for the calling of a function to the external processor 160 by way of the communication channel 140. Additionally, the gateway block 120 can receive an output of the called function in the external processor 160 and subsequently perform an operation and pass these results to associated blocks within the block diagram model environment 105.

In one example, upon determining that a function call should be made to the external processor 160, the gateway block 120 can make the function call across the communication channel 140. The communication channel 140, in communication with the external processor 160, passes control and data to perform the function call to the input port 162 of the external processor 160. Once the preparatory steps of the function call has been completed and the external processor is commanded to run using the communications channel 140 by the block diagram modeling environment 105, the external processor 160 can process the function call using hardware and software contained within the external processor 160. Upon completion of function execution, the block diagram modeling environment 105 can retrieve the results of the called function through the output port 164 of the external processor by using the communication channel 140. The function results are then passed to the input port 132 of the gateway block 120 within the block diagram modeling environment 105.

Additionally, the external environment 160 of the present invention can include a plurality of functions, or libraries of functions. Using the present invention, these functions can be called in any order, and are not limited to the calling of functions in the order in which they are called in the external processor application. Such an arrangement differs greatly from traditional processing techniques wherein the order of function execution must be preserved. Furthermore, should a change in the block diagram model environment 105 occur, wherein the proposed order of function calls from the block diagram model environment 105 is modified, the code running on the external processor 160 does not need to be recompiled.

Figure 3:
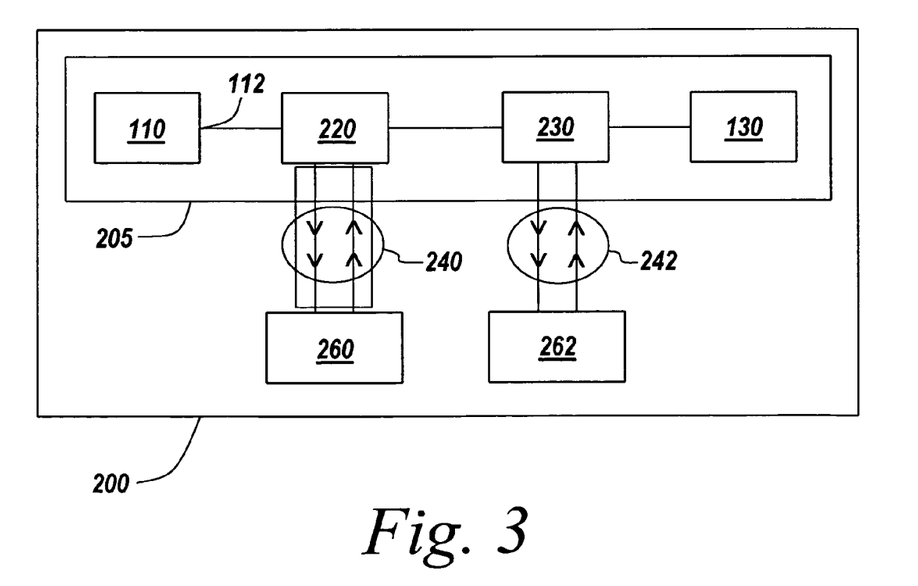
FIG. 3 is an exemplary graphical model for use in incremental development illustrating an environment suitable for practicing the illustrative embodiment of the present invention.

FIG. 3 illustrates a system 200 suitable for practicing an illustrative embodiment of the present invention when used in incremental development of an application design, system, or the like. In the present embodiment two gateway blocks 220, 230 are provided. The first gateway block 220 communicates with a first external processor 260 through a first communication channel 240. The second gateway block 230 communicates with a second external processor 262 through a second communication channel 242. The system 200 of FIG. 3 illustrates an exemplary block diagram model suitable for use in the incremental development of an application design, system or the like, wherein individual portions of the circuit simulated by the block diagram model environment 205 are co-simulated with external processors 260, 262. Those skilled in the art will recognize that any number of external processors 260, 262 can be used with the present invention. Additionally, as readily understood by one skilled in the art, a single external processor 260 can be associated with a plurality of block diagram model environments 205. Furthermore, the present invention allows for varying degrees of interaction between a block diagram environment and one or more external environments. For example, upon execution of a function on a first external processor 260, as controlled from the block diagram model environment, the executed function on the first external environment 260 can in turn control execution of a second function for execution in a second external environment 262. One skilled in the art will readily recognize that numerous levels of interaction between a block diagram model environment and one or more external environments can be accomplished using the present invention.

The external processors 260, 262 depicted in FIG. 3 can include various processors, hardware, or any combination thereof. The code running on these external processors 260, 262 is representative of, or identical to, all or a portion of implemented code for deployment in the external processors 260, 262 of the final model application, system or the like. The code running on the hardware associated with the external processors 260, 262, therefore is the code that will be implemented in the hardware associated with a prototype, beta or final manufactured version of the prior simulated block diagram model environment. In light of this, traditional loops and modified code on hardware in the external processors 260,262 necessary for providing a co-simulation means, are eliminated. Additionally, the hardware associated with the external processors 260, 262 is not aware that the data input to the hardware, and data output from the hardware in the external processors 260, 262 is associated with a block diagram model environment 105.

Figure 4:
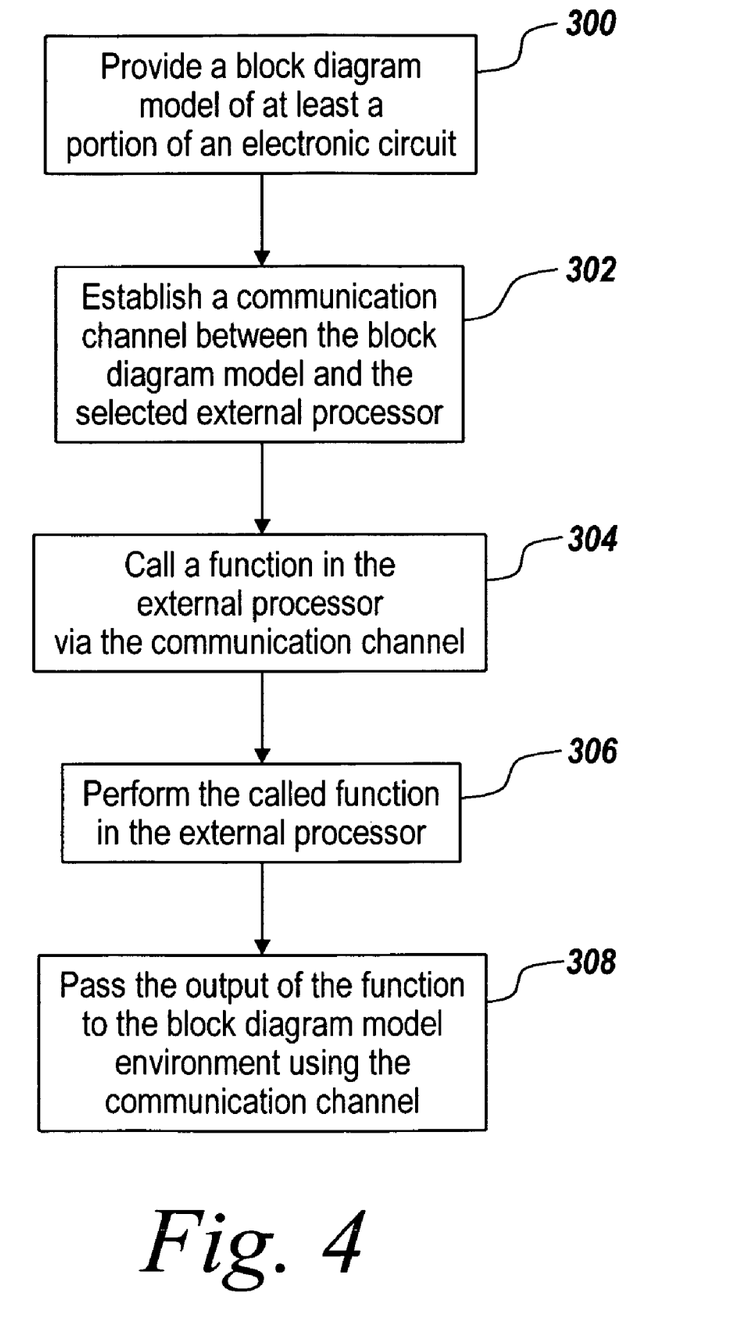
FIG. 4 is an exemplary flowchart that provides an overview of steps taken to practice the illustrative embodiment of the present invention.

FIG. 4 is an exemplary flowchart that provides an overview of steps taken to practice the illustrative embodiment of the present invention when used in conjunction with a block diagram model environment 105. Those skilled in the art will readily recognize that the present invention can be used with numerous block diagram model environments. To simulate an application design, system or the like, a block diagram model of at least a portion of the model design, application, system or the like is provided in accordance with step 300. A communication channel between the block diagram model and a selected hardware component in an external processor is further created in accordance with step 302.

The communication channel can also allow bidirectional communication between the block diagram model environment 105 and the intended external processor. Furthermore, the communication channel allows the calling of a function in the external processor from the block diagram model environment in accordance with step 304. As set forth in step 306, the called function will be executed on the selected hardware component. The output of the function will then be retrieved from the external processor by the block diagram model environment using the communication channel in accordance with step 308.

Figure 5:
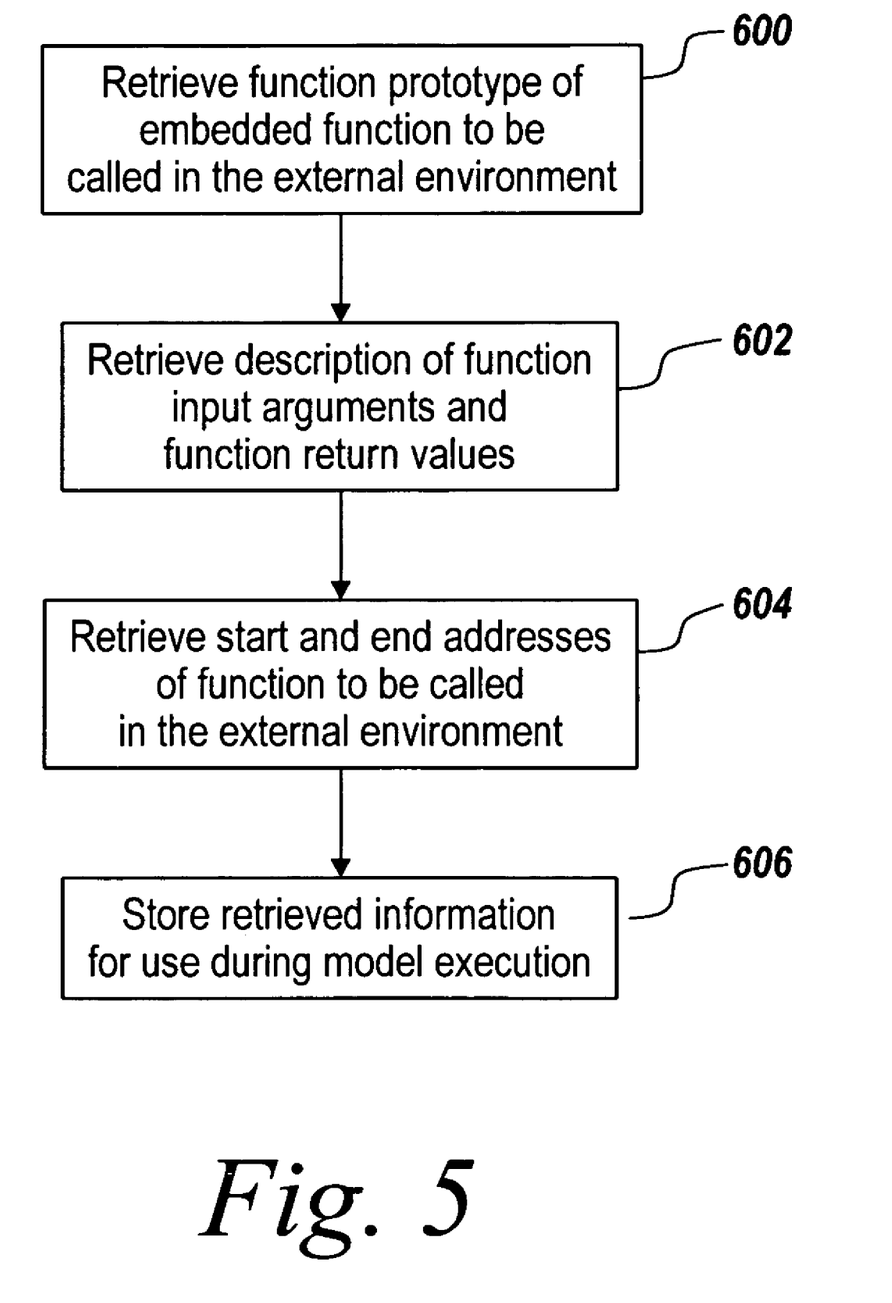
FIG. 5 is an exemplary flowchart that provides an overview of context switching steps taken by the simulation environment during model initialization in the co-simulation when using an API.

FIG. 5 is an exemplary flowchart that provides an overview of preparatory steps taken by the block diagram model environment at model initialization to retrieve and store necessary parameters for later use in calling a function on the external processor during model execution of co-simulation when using an API. As the model in the block diagram model environment initializes, the block diagram model environment performs the steps of FIG. 5 for each function call associated with each gateway block contained within the block diagram model environment. In accordance with step 600, a function prototype is first retrieved. By definition, the function prototype can include, but is not limited to the function name, list of input arguments, input data types, input order, and function return data type. Following retrieval of the function prototype a description of the function input variables and function return arguments are retrieved from the symbol table. Input descriptions may include data memory addresses for globally defined variables to be used as inputs for the function call. If the input variables to be used as function inputs are declared globally, the block diagram can retrieve the global variable locations. If the input variables are declared locally (no static memory locations assigned), the block diagram will seek unused (undeclared) memory locations and store the addresses of the unused memory locations. These unused memory locations are reserved for later use to write input values and to pass input values to the called function. Having a description of the function input arguments and function return values allows the block diagram model environment to deliver the necessary inputs to the function in the external environment in the appropriate format. Additionally, in accordance with step 604 the start and end addresses of the function to be called in the external environment are retrieved and further stored, along with all prior retrieved information, such that upon model execution the stored information can be utilized in communicating with an external processor using one or more gateway blocks.

Figure 6:
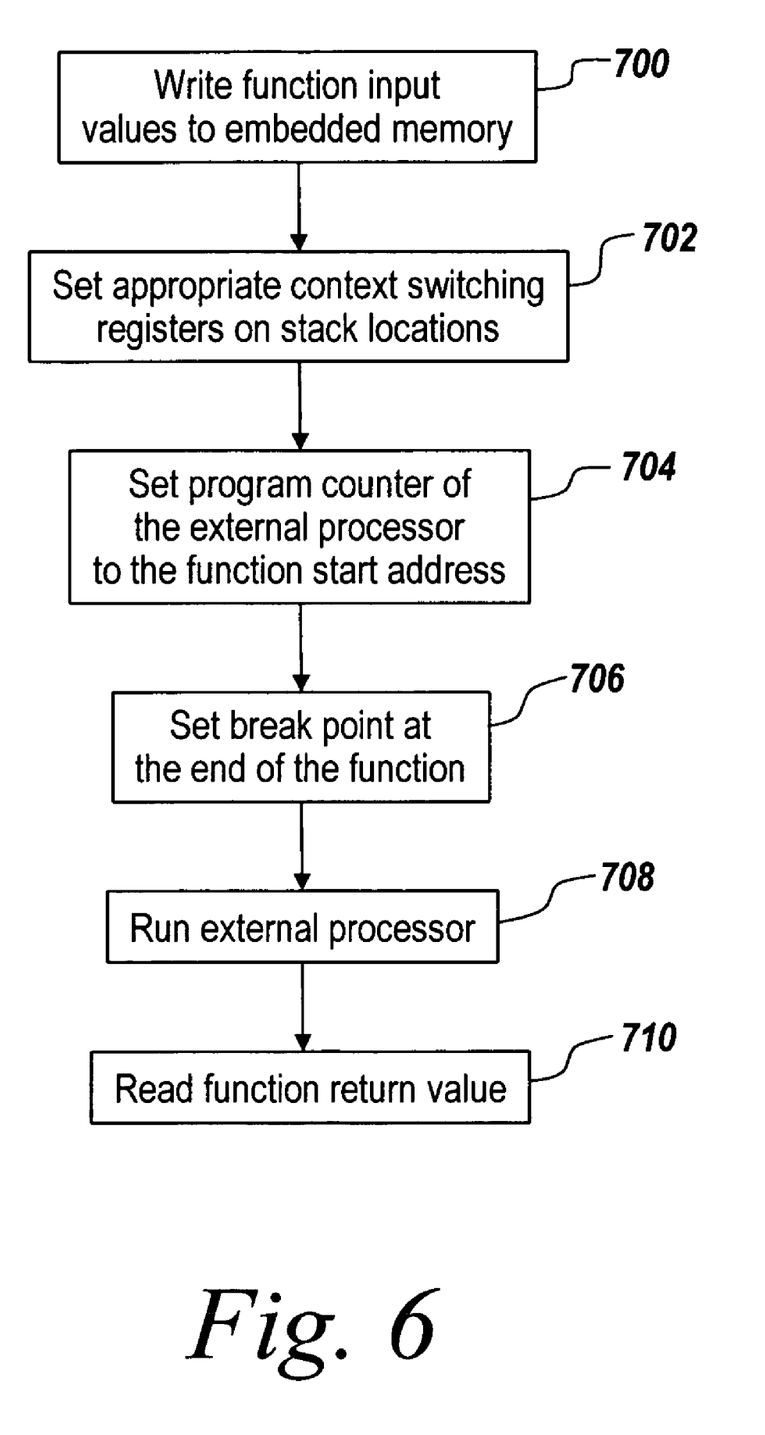
FIG. 6 is an exemplary flowchart that provides an overview of context switching steps taken by the simulation environment at model execution.

FIG. 6 is an exemplary flowchart that provides an overview of context switching steps taken by the block diagram model environment to perform each function call each time the 'gateway' block is executed during model execution. In accordance with step 700, input values to the called function are written to external processor memory by the block diagram model environment, using input memory addresses stored in step 606. Typically, the function input values for use in the external processor are output values provided from blocks within the block diagram model, wherein these blocks' outputs are associated as the inputs to the gateway blocks in the block diagram model environment. Additionally, in accordance with step 702 context-switching registers or stack locations are set in accordance with the requirements of the intended function, and the input passing protocol defined by the external processor's compiler. For example, some compilers pass input arguments via pre-defined registers, while some compilers pass input arguments via the system stack. The input arguments can pass the function inputs by value or by reference. When passing a function input by value, the value of the actual function is passed to the function. In contrast, when passing function inputs by reference, a pointer is passed wherein the pointer denotes the location of the intended data. Furthermore, in accordance with step 704 the program counter (PC) of the external processor is set to the function start address. Setting the program counter provides a means of defining the execution point of the intended function and further denotes the point of context switching from the calling routine in the block diagram environment to the called routine, namely the function on the external processor. As set forth in step 706 the breakpoint is further set at the end of the intended function to be executed in the external processor to limit the processor execution to the intended called function, and the external processor is run (step 708), thereby allowing the intended function on the external processor to execute. Following step 708, the outputs of the function executed on the external processor (710) are retrieved from within the block diagram model. The outputs can be the function return values (passed either by reference or passed by value) or modified inputs found at the memory locations (stored in step 606) of the modified input variables. Furthermore, this data can be used as an output of the gateway block and thereby passed to associated blocks in communication with the gateway block of the block diagram model environment.

Figure 7:
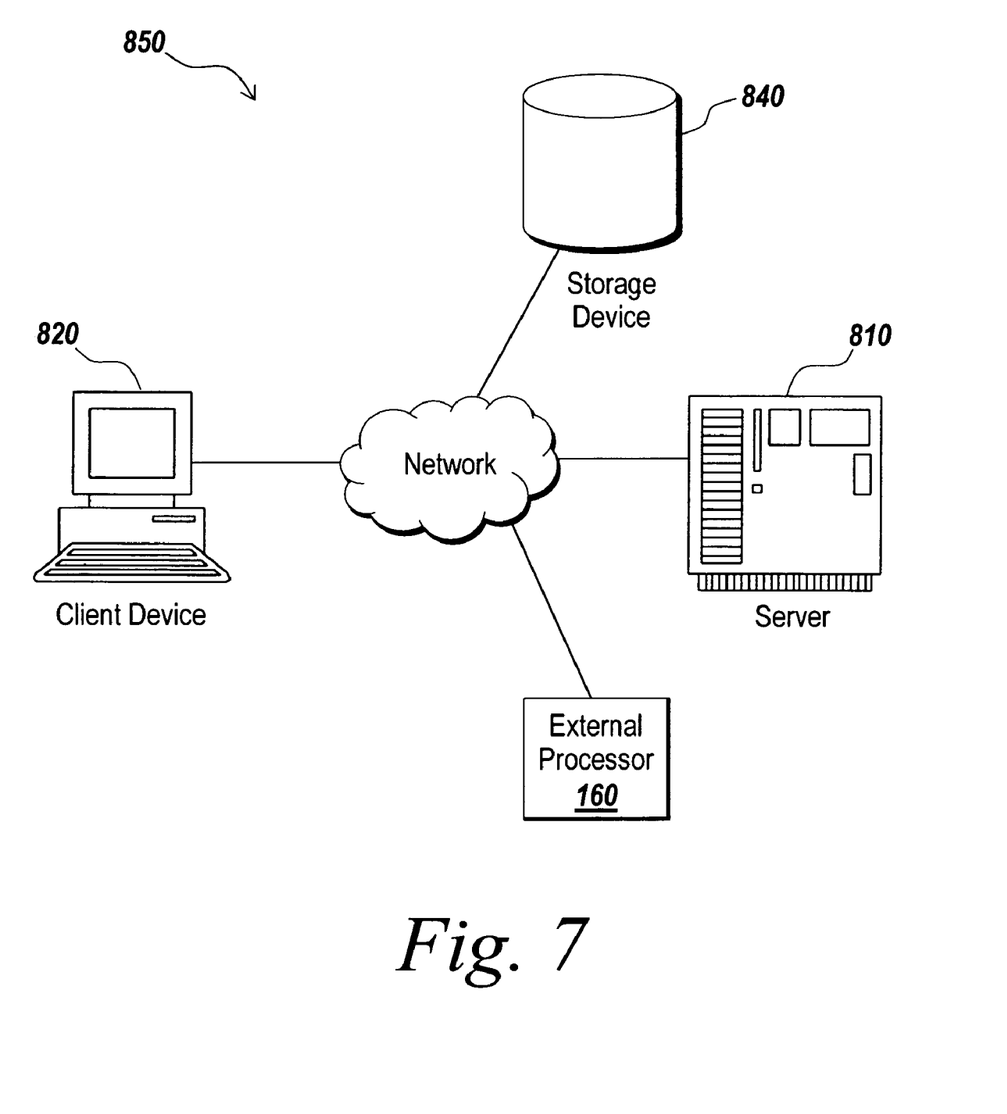
FIG. 7 is a graphical representation that provides an overview of the use of the present invention within a distributed environment.

FIG. 7 details the practice of the present invention within a distributed environment. The present invention includes a distribution server 810 for providing to a client device a gateway block capable of communicating with an external processor 160 over a network 850 and a client device 820 in communication with the distribution server 810 such that functions on the external processor 160 can be called directly from the client device. Further associated with the network 850 is a storage device 840 for storing the gateway block, the results of the executed function in the external environment, as well as any additional data necessary for practicing the present invention.

The illustrative embodiment has been described above for illustrative purposes relative to the technical computing environment of MATLAB and SIMULINK from The MathWorks, Inc. of Natick, Mass. Although the illustrative embodiment has been described relative to a MathWorks-based application, one of ordinary skill in the art will appreciate that the present invention may be applied to other graphical modeling environments and technical computing environments, such as any technical computing environments using software products of Rhapsody from I-Logix Inc., TargetLink and Real-Time Interface from dSPACE GmbH, RT-LAB™ from Opal-RT Technologies, Inc., EXITE from EXT-ESSY AG, LabVIEW®, MATRIXx from National Instruments, Inc., Mathematica® from Wolfram Research, Inc., Mathcad of Mathsoft Engineering & Education Inc., Dymola from Dynasim AB, or Maple™ from Maplesoft, a division of Waterloo Maple Inc. Furthermore, one ordinarily skilled in the art will appreciate that the present invention may apply to any graphical modeling environment, such as one providing modeling with a Unified Modeling Language (UML), Hardware Description Language (HDL), or that provides a physics modeling domain.

The present invention has been described by way of example, and modifications and variations of the described embodiments will suggest themselves to skilled artisans in this field without departing from the spirit of the invention. Aspects and characteristics of the above-described embodiments may be used in combination. The described embodiments are merely illustrative and should not be considered restrictive in any way. The scope of the invention is to be measured by the appended claims, rather than the preceding description, and all variations and equivalents that fall within the range of the claims are intended to be embraced therein.

We claim:

1. In a computing device providing a graphical modeling environment, a method for executing a function on a selected processor in an environment external to the graphical modeling environment from the graphical modeling environment, the method comprising:
   altering data held by one or more memory locations accessible by the selected processor,
   resetting a program counter on the selected processor to a start location of the function,
   executing the function on the selected processor from the graphical modeling environment, the selected processor being external to the graphical modeling environment,
   halting the program counter on the selected processor,
   reading data held by the one or more memory locations accessible by the selected processor, and
   managing context switching between the graphical modeling environment and the selected processor.

2. The method of claim 1, wherein the external environment comprises a 'processor in the loop' environment.

3. The method of claim 1, wherein the external environment comprises a 'hardware in the loop' environment.

4. The method of claim 1, wherein the external processor comprises an integrated development environment (IDE).

5. The method of claim 1, wherein altering data held by one or memory locations provides to the external processor an input value for use by the function.

6. The method of claim 1, wherein altering data held by one or more memory locations provides to the external processor a reference to a value for use by the function.

7. The method of claim 1, further comprising setting a breakpoint for the function.

8. The method of claim 1, wherein at least one of the memory locations includes a memory cell.

9. The method of claim 1, wherein at least one of the memory locations includes a register.

10. A computer-readable storage medium holding instructions executable in a computational device that when executed cause the computational device to provide an environment for modeling a system and executing a function in a selected processor external to the environment for modeling the system, the medium comprising:
    instructions for providing a block diagram model environment;
    instructions for altering data held by one or more memory locations accessible to the selected processor,
    instructions for resetting a program counter in the selected processor to a start location of the function,
    instructions for executing the function in the selected processor from within the block diagram model environment,
    instructions for halting the program counter in the selected processor, and
    instructions for retrieving an output of the function from within the block diagram model environment,
    wherein the block diagram model environment further comprises a gateway block, wherein said gateway block is in communication with the block diagram model environment and the selected processor.

11. The medium of claim 10, wherein the block diagram model environment includes an interface to an integrated development environment (IDE).

12. The medium of claim 10, wherein an application program interface (API) is invoked in the block diagram model environment such that said API is used to establish communications between the block diagram model environment and the selected processor.

13. The medium of claim 10, wherein the gateway block manages context switching between the block diagram model environment and the selected processor.

14. The medium of claim 10, wherein a breakpoint of the function is set from within the block diagram program environment.

15. The medium of claim 10, wherein at least one of the memory locations includes a memory cell.

16. The medium of claim 10, wherein at least one of the memory locations includes a register.

* * * * *